July 26, 1932. T. F. SPICKNALL 1,868,924
FUEL CHARGING DEVICE FOR GAS GENERATORS
Filed Jan. 9, 1931 3 Sheets-Sheet 2

INVENTOR.
Thomas F. Spicknall.
BY Jesse R. Langley
ATTORNEY.

July 26, 1932.  T. F. SPICKNALL  1,868,924
FUEL CHARGING DEVICE FOR GAS GENERATORS
Filed Jan. 9, 1931  3 Sheets-Sheet 3
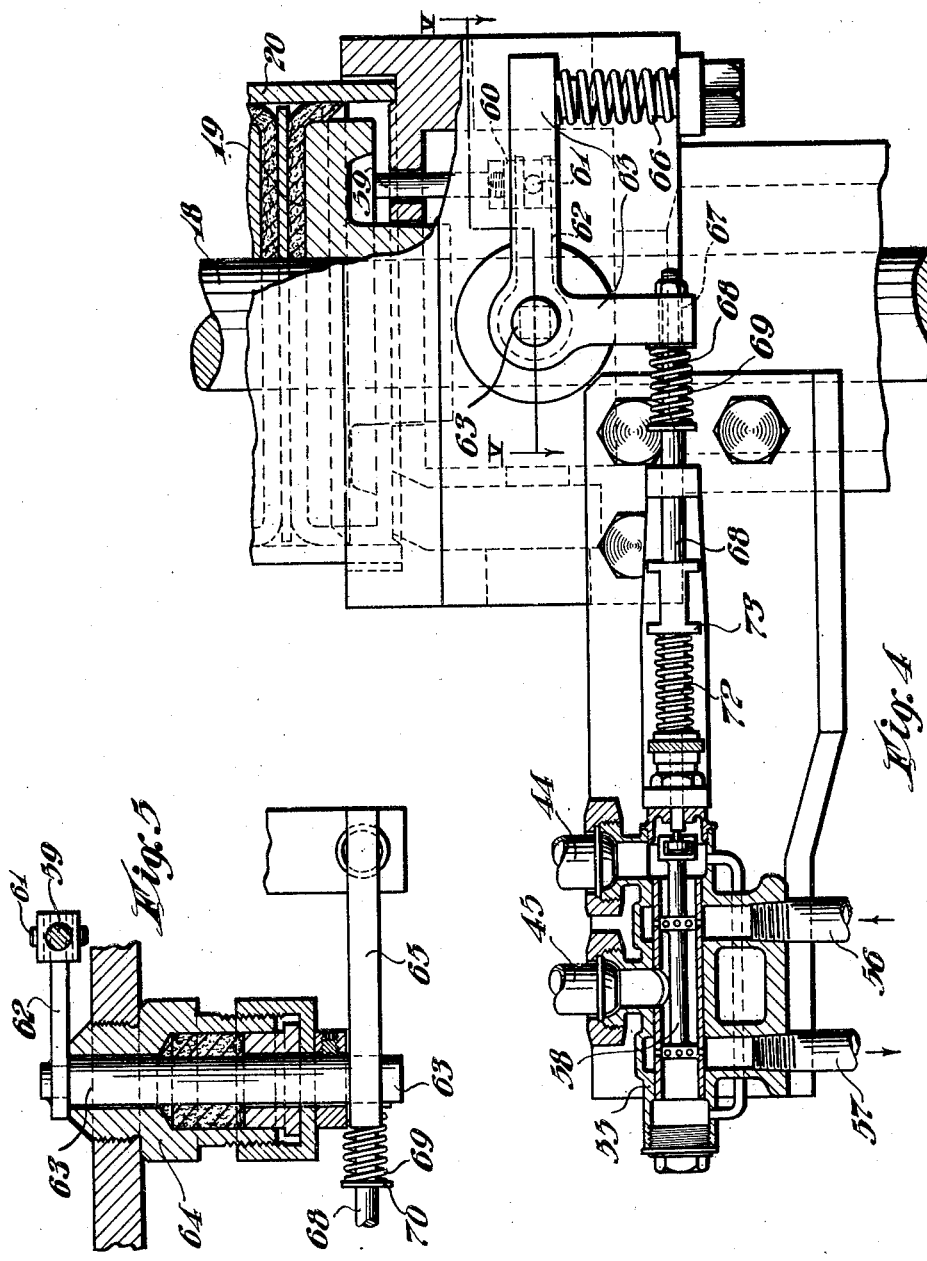
INVENTOR.
Thomas F. Spicknall.
BY Jesse R. Langley
ATTORNEY.

Patented July 26, 1932

1,868,924

UNITED STATES PATENT OFFICE

THOMAS F. SPICKNALL, OF BALTIMORE, MARYLAND, ASSIGNOR TO THE WESTERN GAS CONSTRUCTION COMPANY, A CORPORATION OF INDIANA

FUEL CHARGING DEVICE FOR GAS GENERATORS

Application filed January 9, 1931. Serial No. 507,602.

My invention relates to fuel-charging devices for gas generators such, for example, as generators ordinarily employed in the manufacture of water gas and the like from solid carbonaceous fuel.

My invention relates more particularly to devices for either partially or wholly retaining fuel within a charging mechanism adapted to be positioned over the charging opening of such a gas generator and effective to modify the rate and manner of fuel discharge into the generator during a charging period.

Fuel-charging apparatus for a gas generator, and more particularly a gas generator in which the manufacture of gas is conducted in an intermittent or periodic cycle, for example a water-gas generator ordinarily comprises a closed hopper adapted to be positioned over the charging opening of the gas generator. Such hopper has an inlet door for the periodic admission of fuel to the hopper and a charging valve which in most instances is located in the charging opening of the generator in such manner and position as to serve as a closure for the same. Such charging apparatus is described and claimed, for example, in U. S. Patent No. 1,597,314 to A. C. Howard and T. W. Stone.

In the operation of such charging apparatus it is customary to lower the charging valve into the gas generator at a predetermined point in the cycle of operation of the latter, the inlet door to the charging hopper being closed at this time. Fuel previously introduced into the charging hopper is thus permitted to drop into the gas generator while at the same time entrance of air to the interior of the generator and the escape of gas from the generator to the surrounding atmosphere are prevented.

In order to secure more favorable distribution of fuel upon the fuel bed within the gas generator, it is customary to employ a charging valve of substantially conical shape and in order to permit the lowering of such a valve to effect the proper distribution of the fuel, it has been proposed to employ fuel-retaining devices which retain the fuel within the charging hopper until the charging valve has been lowered to a position within the gas generator and relatively close to the upper surfaces of the generator fuel bed.

The fuel is then permitted to fall into the generator, and by reason of the distance through which it falls and the shape of the charging valve, improved distribution of the fuel to the outer edge of the fuel bed is obtained.

An object of the present invention is to provide a fuel-charging device for a gas generator having improved details of construction and advantages with respect to the devices of the prior art.

A further object of my invention is to provide a fuel-retaining or retarding device which is effective to permit the descent of a relatively small portion of the fuel from the charging hopper of a charging device for a gas generator into the generator during the lowering of the charging valve into the latter and effective to discharge the remaining fuel into the generator en masse at the conclusion of the downward stroke of the charging valve.

A still further object of my invention is to provide advantageous means for interlocking the operation of the fuel-retaining devices with that of the charging valve.

My invention has for further objects such other operative advantages and results as may hereinafter be found to obtain.

My invention contemplates the provision of a fuel-retaining device located within the fuel hopper of a charging device of the character indicated which is so supported during such time as the charging valve is closed or at an intermediate point between its closed position and its open or lowered position as to be extended over the charging opening of the gas generator or a major portion thereof, but which is adapted to be collapsed when the charging valve reaches its lowermost position in its travel into the generator, so as to permit the free flow of fuel from the hopper through the charging opening into the gas generator.

In its preferred form, the device of my invention comprises a substantially conical flexible structure composed, for example, of a foraminous fabric, such as coarse metal chain cloth, or a plurality of metal chains, the whole supported, for example, upon a plurality of ribs having their upper ends pivotally secured and having means for raising and lowering the ribs to extend or collapse the fabric structure, respectively, according to the position of the charging valve.

My invention further comprises means for operating the charging valve, including a reversible hydraulic cylinder and a valve located in the hydraulic pressure and relief lines leading to this cylinder which is operated by the stroke of the charging valve.

In order that my invention may be fully set forth and understood, I now describe, with reference to the accompanying drawings, a preferred form in which it may be constructed and embodied. In these drawings, Figures 1 and 2 are vertical and horizontal sectional views, respectively, of a fuel charging device for a gas generator constructed in accordance with my present invention, Figure 1 being taken on the line I—I of Fig. 2, and Fig. 2 being taken on line II—II of Fig. 1;

Fig. 4 is a view partly in elevation and partly in vertical section of an interlocking device for portions of the apparatus shown in Figs. 1, 2 and 3; and Fig. 5 is a horizontal sectional view of a portion of the apparatus shown in Fig. 4, being taken on line V—V of Fig. 4.

Similar characters of reference designate similar parts in each of the views of the drawings.

Figure 1:
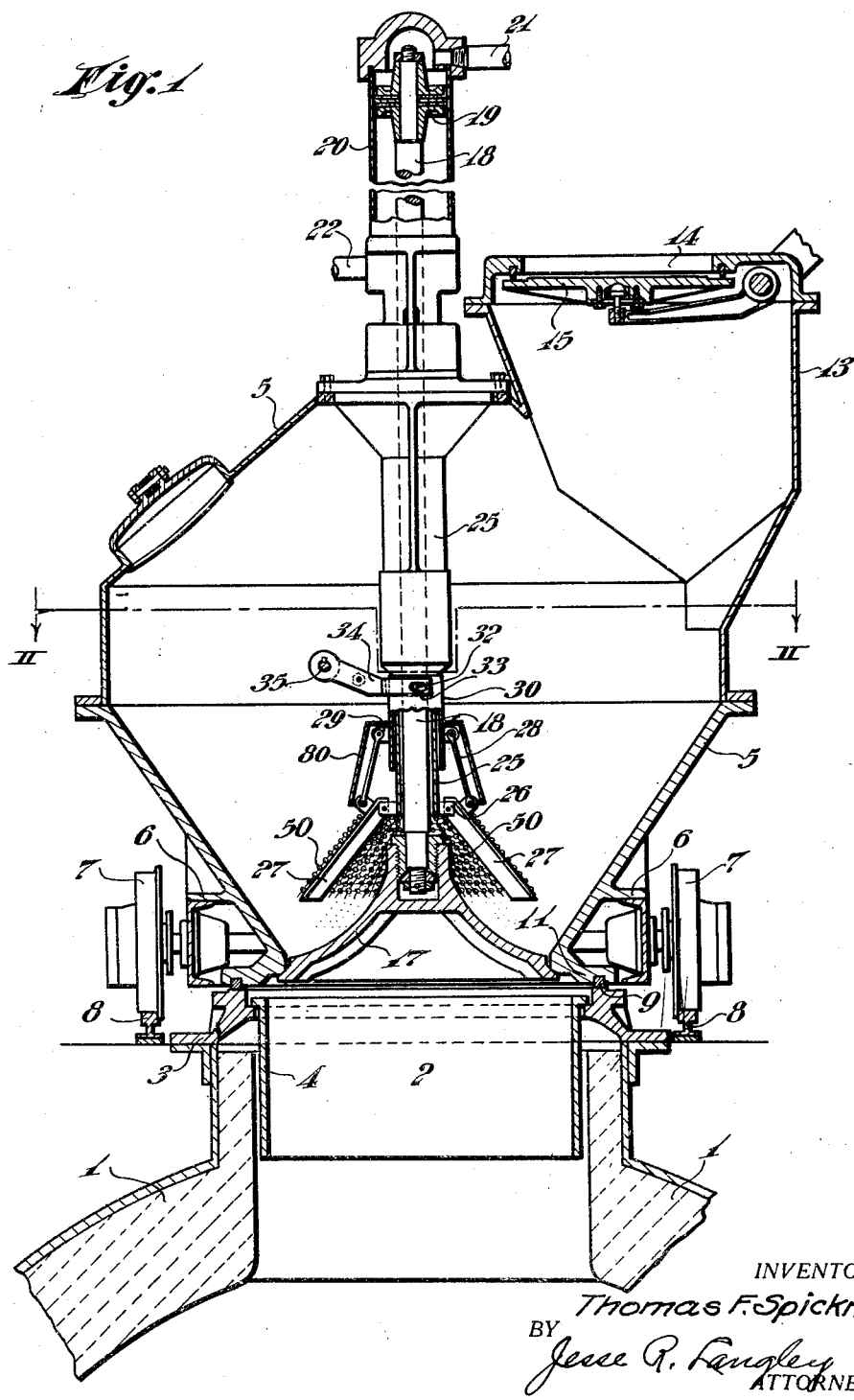
Figure 2:
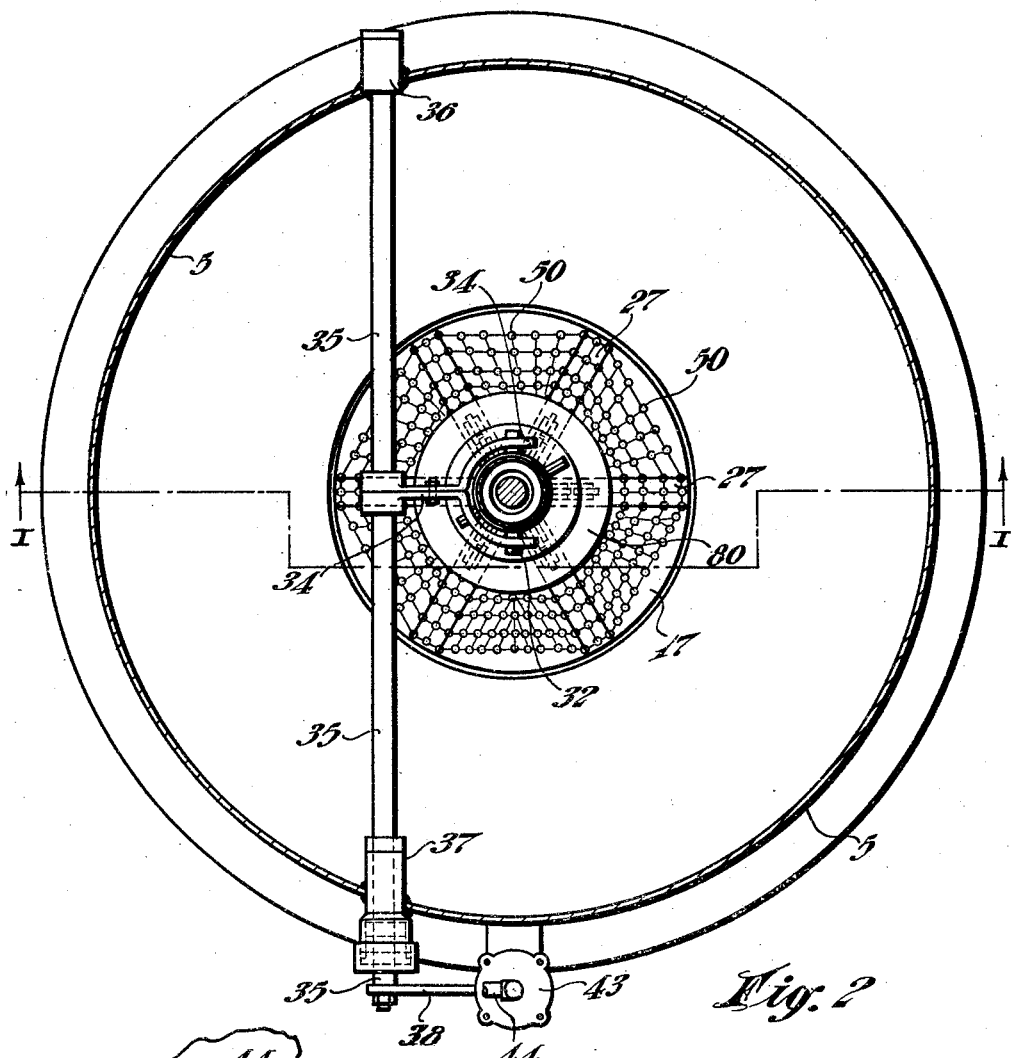
Figure 3:
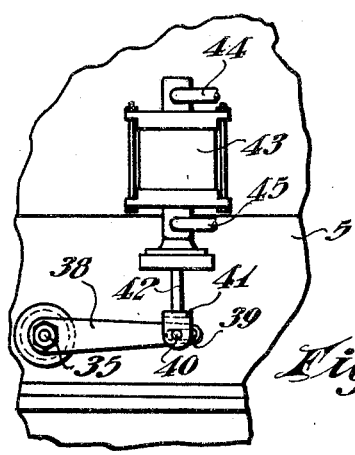
Fig. 3 is a vertical elevational view of a portion of the apparatus shown in Fig. 2.

Referring to the drawings, there is shown a gas generator 1 having a charging opening 2 provided with a rim 3 and a protecting sleeve 4.

The fuel-charging device for the gas generator 1 comprises a fuel hopper 5 located immediately above the charging opening 2 of the gas generator 1 and which may be mounted for convenience upon a truck 6 having wheels 7 corresponding to rails 8 upon either side of the rim 3 of the gas generator 1. By means of appropriate apparatus (not shown) the hopper 5 may be moved in position over the charging opening 2 of the gas generator 1 along the tracks 8 and when in that position may be lowered until it rests upon the rim 3, close contact at this point being secured by a suitable gasket 9 located in a flange 11 at the bottom of the hopper 5. The gasket 9, as shown, engages the rim 3 when the hopper 5 has been lowered over the charging opening 2 and effectively seals off the interior of the apparatus from the surrounding atmosphere at this point.

The hopper 5 in the present instance is provided with a chute or funnel 13 having an opening 14 on the upper portion thereof which is provided with an inlet valve or door 15 adapted to be swung inward to permit the introduction of fuel into the hopper 5, and at other times to be swung into such position as to engage and close the opening 14, and in the latter position to prevent the flow of air into the charging hopper or the escape of gas therefrom. The inlet door 15 is kept in a closed position at all times except during the periods in which fuel is being admitted to the hopper 5 for subsequent delivery to the gas generator 1.

Within the hopper 5 there is located a charging valve 17, preferably of conical configuration, adapted to engage the inner and lower edge of the flange 11 at the bottom of the hopper 5, but of such size as to permit its entry into the generator 1 through the charging opening 2 when desired. In Fig. 1 the charging valve 17 is shown in its uppermost position in which it effects the closure of the charging opening 2, thus preventing flow of gas from the generator 1 into the interior of the hopper 5 or vice versa.

The charging valve 17 is supported by a vertical shaft 18 terminating at its upper end in a piston 19 located within a hydraulic cylinder 20 having hydraulic pressure and relief conduits 21 and 22 serving to admit or withdraw a liquid from the spaces above and below the piston 19 in the hydraulic cylinder 20, respectively. By means of appropriate mechanism, such as that ordinarily employed to control the operation of the remaining operating valves of the water gas set of which the generator forms a part, the conduits 21 and 22 may be alternately and oppositely connected with a source of liquid under pressure and a drain, respectively, in order to effect a lifting or lowering of the charging valve 17 as the case may be.

In the position shown in Fig. 1, liquid under pressure is assumed to have been delivered through conduit 22 to that portion of the interior of the cylinder 20 below the piston 19, thus holding the charging valve 17 in its uppermost position. The conduit 21 is at this time connected to a drain. At an appropriate point in the cycle, for example, during a downrun or backrun period of the water gas cycle, pressure conditions in the conduits 21 and 22 are reversed, and the charging valve 17 is then lowered into the generator for a distance corresponding to the free travel of the piston 19 in the cylinder 20.

The shaft 18 is enclosed at a point just above its junction with the charging valve 17 by a sleeve structure 25 fastened to the top of the hopper 5. The sleeve structure 25 is provided at its lower end with a plurality of brackets 26 which are pivotally secured to the upper ends of a corresponding plurality of ribs 27.

The ribs 27 are in turn pivotally secured by a corresponding plurality of links 28 to brackets 29 located around the periphery of a sleeve 30 which encircles the sleeve structure 25 and which has a sufficient clearance from the latter to permit free vertical movement. The sleeve 30 has at its upper end a pair of oppositely extending pins or lugs 32 extending through slots 33 in the arms of a yoke 34 mounted upon and keyed to a horizontal shaft 35.

The shaft 35 is secured at one end in a bearing 36 in the hopper 5 and at the other end passes through a bearing 37 and terminates in a lever 38. Lever 38 has a slot 39 surrounding a pin 40 in a yoke 41 attached through a shaft 42 to a piston (not shown) located within the hydraulic cylinder 43 having hydraulic pressure and relief conduits 44 and 45.

Reversal of pressure conditions in the conduits 44 and 45 thus effects a raising or lowering of the piston within the cylinder 43, as the case may be, and by thus moving the free end of the lever 38 rotates the shaft 35 and raises or lowers the yoke 34, thus extending or collapsing the ribs 27, as the case may be. In the preferred instance, the ribs 27 are so designed as to permit their being raised to an angle of about 45° from the vertical and of such length as to offer some four or five inches clearance between their lower ends and the sides of the hopper 5 when in this raised position.

Lowering of the piston within the cylinder 43 causes the ribs 27 to swing downward to hang substantially vertically from the brackets 26.

In the present instance, the ribs 27 are shown as covered with and attached to a fabric 50 comprised of a coarse metal wire cloth having sufficient flexibility to permit the collapse of the ribs 27 in the manner indicated. The mesh may be of such character as to permit the passage therethrough of small particles of the fuel although this may be dispensed with when so desired.

In the operation of the charging device during the cycle of operation of the gas generator, the inlet door 15 is opened to permit the introduction of fuel in the hopper 5, the charging door 17 being in its uppermost or closed position at this time and after the requisite quantity of fuel has been admitted the inlet door 15 is then closed. Subsequently, when it becomes desirable to do so, the charging valve 17 is lowered into the gas generator.

During its course of travel downward some fuel may be discharged from the charging hopper 5 into the gas generator, the amount depending upon the clearance between the lower extended ends of the fabric 50 and the sides of the hopper 5 but the bulk of the fuel is retained within the hopper 5 until the charging valve 17 reaches its lowermost position when the ribs 27 are lowered, collapsing the fuel-retaining fabric 50 and permitting the immediate and rapid discharge of this remaining fuel into the generator 1.

In order that the operation of the fuel retaining or retarding device may be rendered automatic, I prefer to have the valve which controls the pressure conditions within the hydraulic cylinder 43 operated by movement of the charging valve structure and this preferred form is illustrated in Figs. 4 and 5.

In this modification the conduits 44 and 45 leading to the top and bottom, respectively, of the hydraulic cylinder 43 are connected through a four-way valve 55 of well known type to conduits 56 and 57, which are connected to a source of hydraulic fluid under pressure and a drain, respectively.

The operation of this device is too well known to require detailed description, and it will suffice to say that movement of a valve stem 58 to the left from the mid-position in which it is shown in Fig. 4 causes a flow of high pressure liquid through the conduit 44 to the top of the hydraulic cylinder 43 and the removal of liquid from the lower portion of the cylinder 43 through the conduits 45 and 57, and thus lowers the piston within the cylinder 43. This causes the collapse of the ribs 27 and fabric 50.

A subsequent movement of the valve stem 58 to the right reverses the pressure conditions in the cylinder 43 by supplying liquid at high pressure through the conduits 56 and 45 to the bottom of the operating cylinder 43 and removing displaced liquid from the upper portion of the cylinder 43 through the conduits 44 and 57, thus raising and extending the ribs 27 and fabric 50.

As shown in Fig. 4, a pin 59 is provided in the lower wall of the hydraulic cylinder 20, extending through the same in such position as to be engaged and depressed by the piston 19 just as it ends its downward travel. The pin 59 is provided at its other end with a yoke 60 having a further pin 61 at right angles to the pin 59 and which engages a yoked lever 62. The lever 62 is attached at its other end to a horizontal shaft 63 which passes through a combined bearing and stuffing box or gland 64. The shaft 63 is attached at the end opposite to the lever 62 to a bell-crank lever 65.

As will be clear from consideration of Fig. 4, depression of the pin 59 by the lowering of the piston 19 tends to rotate the levers 62 and 65 in a clockwise direction which is resisted by the action of a spring 66 exerted against one arm of the lever 65. The other arm of the lever 65 is provided with a hole or slot 67 surrounding a rod or shaft 68 which in turn connects with and forms an extension of the valve stem 58 of the valve 55.

A spring 69 is provided between a washer 70 fastened to the shaft 68 and the vertical arm of the lever 65 so that the aforesaid clockwise movement of the lever 65 causes a compression of the spring 69, tending to move the shaft 68 and valve stem 58 to the left. This is resisted by the action of a spring 72 located between the body of the valve 55 and a cross head 73 located upon the shaft 68 but which is of such size as to exert a lesser force than that exerted by compression of the spring 69.

Thus the spring 72 tends to hold the valve stem 58 in the right hand position at all times except when the piston 19 engages and lowers the pin 59 and the spring 66 maintains the pin 59 in a position to be engaged by the piston 19 when the latter approaches the end of its stroke.

Thus when the piston 19 approaches the end of its stroke it depresses the pin 59, rotating the levers 62 and 65 in a clockwise direction and moving the valve stem 58 to the left, thus causing the piston in cylinder 43 to be lowered and the ribs 27 and fabric 50 to be collapsed.

In the position shown in Fig. 4, the valve stem 58, lever 65 and pin 59 are shown as in an intermediate portion of their stroke, that is to say, at some time after the piston 19 has engaged the pin 59 but before the downward movement of the pin 59 and the movement of the valve stem 58 to the left are completed.

In order to protect the fuel-supporting fabric or structure from the weight of fuel within the hopper 5, I may provide a cover or apron 80 fastened to and supported by the sleeve 30 above the links 28 and ribs 27.

It will be seen from the above that my invention comprises an improved fuel-retaining or retarding device for fuel chargers for gas generators, and it will be obvious that my invention is not limited to the specific details given hereinabove by way of example but is to be construed as of the scope of the claims hereinafter made.

I claim as my invention:

1. A charging device for gas generators comprising a hopper adapted to be positioned over the charging opening of a gas generator, a charging valve located in said hopper and constituting a door for said charging opening, and a collapsible fuel retaining device situated in said opening and adapted to collapse when said charging valve has been opened.

2. A charging device for gas generators comprising a hopper adapted to be positioned over the charging opening of a gas generator, a charging valve located in said hopper constituting a door for said charging opening and adapted to be lowered into said generator, a collapsible fuel retaining device also located in said charging opening, and means for collapsing said fuel retaining device when said charging valve has been lowered into said generator.

3. A charging device for gas generators comprising a hopper adapted to be positioned over the charging opening of a gas generator, a collapsible foraminous fuel-retaining device also located in said charging opening, and means for collapsing said device when said charging valve is lowered into the generator.

4. A charging device for gas generators comprising a hopper adapted to be positioned over the charging opening of a gas generator, a charging valve located in said hopper and constituting a door for said charging opening, a fuel-supporting fabric located above said charging opening, a plurality of supporting ribs therefor, and means for lowering said ribs to collapse said fabric when said charging valve is opened.

5. A charging device for gas generators comprising a hopper adapted to be positioned over the charging opening of a gas generator, a charging valve located in said hopper and constituting a door for said charging opening, a plurality of ribs suporting a flexible fuel-retaining structure of substantially conical shape located above said charging opening, and means for lowering said ribs to collapse said fabric and release the fuel retained by it, when said charging valve is lowered into the generator.

6. A charging device for gas generators comprising a hopper adapted to be positioned over the charging opening of a gas generator, a charging valve located in said hopper and constituting a door for said charging opening, a plurality of ribs pivotally secured at the upper ends thereof and adapted when raised to support a substantially cone-shaped fuel-retaining fabric above said charging opening and when lowered to collapse said fabric, and means for lowering said ribs when said charging valve has been lowered into said generator.

7. A charging device for gas generators comprising a hopper adapted to be positioned over the charging opening of a gas generator, a charging valve located in said hopper and constituting a door for said charging opening, a substantially cone-shaped collapsible fuel-retaining structure comprised of a plurality of metal links, supporting ribs therefor pivoted at their upper ends, and means for lowering said ribs to collapse said fabric and discharge fuel retained thereby into the generator when said charging valve is in an open position.

8. A charging device for gas generators comprising a hopper adapted to be positioned over the charging opening of a gas generator, a charging valve located in said opening and constituting a door for said charging opening, a vertical shaft supporting said charging valve and terminating in a piston within a hydraulic pressure cylinder adapted to lower said charging valve into said generator and raise it to close said charging opening, a fixed casing surrounding said shaft, a plurality of ribs pivotally secured at the upper ends thereof to said casing, a sleeve surrounding said casing and adapted for vertical reciprocal motion thereon, a plurality of links connecting said sleeve and said ribs, a flexible fuel-supporting metal fabric supported on said ribs, and means for lowering said sleeve to collapse said fabric when said charging valve is lowered into said generator.

In testimony whereof, I have hereunto subscribed my name this thirty-first day of December 1930.

THOMAS F. SPICKNALL.